FIG. II.

I. W. COLBURN.
DEVICE FOR MAINTAINING THE WIDTH OF SHEETS OF GLASS BEING DRAWN.
APPLICATION FILED JAN. 27, 1908.

940,675.

Patented Nov. 23, 1909.
6 SHEETS—SHEET 6.

FIG.12.

Witnesses

Inventor
By his Attorneys

UNITED STATES PATENT OFFICE.

IRVING W. COLBURN, OF FRANKLIN, PENNSYLVANIA, ASSIGNOR TO COLBURN MACHINE GLASS COMPANY, OF FRANKLIN, PENNSYLVANIA, A CORPORATION OF NEW JERSEY.

DEVICE FOR MAINTAINING THE WIDTH OF SHEETS OF GLASS BEING DRAWN.

940,675.

Specification of Letters Patent. Patented Nov. 23, 1909.

Application filed January 27, 1908. Serial No. 412,892.

*To all whom it may concern:*

Be it known that I, IRVING W. COLBURN, of Franklin, Venango county, Pennsylvania, have invented a new and useful Improvement in Devices for Maintaining the Width of Sheets of Glass Being Drawn, which invention is fully set forth in the following specification.

This invention relates to the art of drawing sheet glass. In this art it is a well-known fact that when attempts are made to draw glass in sheet form directly from a molten mass the sheet has a tendency to narrow down to a string or thread as the bait recedes from the molten mass, and it is the object of the present invention to provide means whereby the width of said sheet may be automatically maintained substantially uniform.

In my United States Patent No. 836,439, dated November 20th, 1906, I have shown a machine for drawing sheet glass provided with one kind of means for overcoming the narrowing tendency of the sheet being drawn, and in my pending United States application Sr. No. 368,096, filed April 13th, 1907, I have shown a similar machine provided with a different means for overcoming the narrowing tendency of the sheet. Both of the constructions shown in my said patent and application constitute efficient means for overcoming the narrowing tendency of the sheet during the drawing operation.

The present invention is designed to afford still other means for automatically maintaining the width of the sheet during the drawing operation.

Broadly stated, the invention consists in two pairs of automatically operated gripping fingers, one pair being located at each edge of the sheet during the drawing operation and slightly above the point where the sheet emerges from the molten mass. These oppositely disposed sets of gripping fingers are adapted to so operate that the edges of the upwardly moving sheet of glass are seized and held between them for a short space during its upward travel, and also slightly stretched laterally, after which said fingers automatically release their hold, move downward, and again seize the sheet, as before, this operation being automatically and regularly repeated throughout the drawing process.

My invention also covers means whereby the intervals and duration of said seizures may be timed or regulated with reference to one another, and also whereby the operation of the device as a whole is harmonized synchronously with the drawing mechanism proper. This drawing mechanism may be of any suitable construction for drawing the glass in sheet form, and is preferably that shown and described in my Letters-Patent and application aforesaid.

The inventive idea involved is capable of expression in a variety of mechanical structures, one of which, for the purpose of illustration, is shown in the accompanying drawings in connection with a glass machine of the general character shown and described in my said patent and application, but it is to be understood that the drawings are for the purpose of illustration only, and are not intended to limit the invention to the particular form of apparatus shown, nor to use with the particular character of machine shown.

In said drawings Fig. 5ª is a perspective detail showing a fragment of one of the arms with the trunnion sleeve mounted thereon; Fig. 7 is an enlarged plan view with portions broken away for the purpose of exposing other parts to view.

Corresponding reference numerals indicate corresponding parts in the several views of the drawing.

Referring to the drawings, 1, 1, indicate two tubular arms preferably constructed of pipe or tubing, and each provided at the inner or working chamber extremity with the gripping fingers 2, 2, each of which fingers preferably consists of horizontal inwardly disposed bends. Each of the tubular arms is surrounded by a sleeve 3 rigidly secured thereto and having two oppositely disposed horizontally extending trunnions 4, 4. The end of each arm opposite the fingers 2 is provided with a suitable fitting, preferably in the form of a T 5. In the outer end of said T 5 there is introduced a pipe or tube 6 of less diameter than the inner diameter of the tubular arm 1, said pipe or tube 6 extending into proximity with the end of finger 2. Attached to a branch of the T 5 is an escape pipe 7, the entire structure being such that water or other cooling fluid may pass inward through the pipe 6 to the fingers 2, and outward between the pipe 6 and the walls of the tubular arm 1, escaping through the pipe 7.

Figures 8, 9:
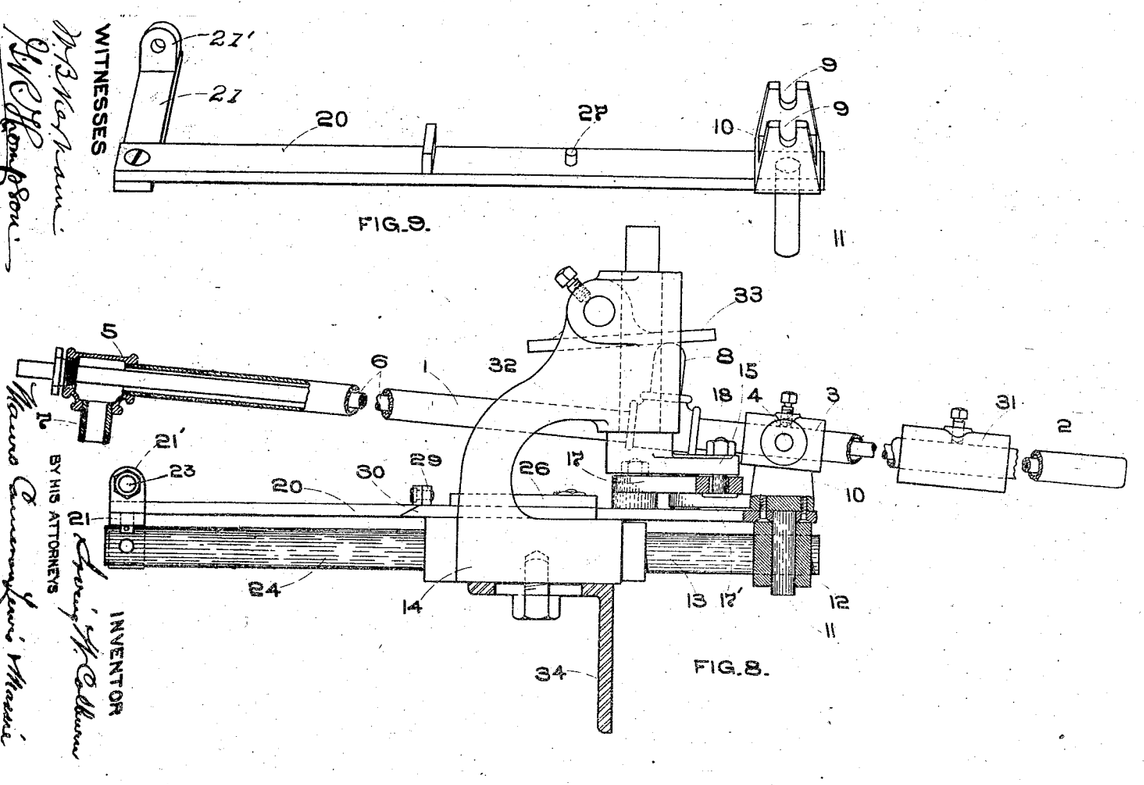
Fig. 8 is an enlarged side elevation with portions shown in section.
Fig. 9 is a perspective view of the swinging lever.

Each of the tubular arms 1 has secured thereto in any suitable manner, as by a sleeve surrounding the arm, a vertically extending stud 8. The trunnions 4, 4, rest in suitable trunnion bearings 9, 9, see Fig. 9, provided therefor in upwardly extending brackets 10, 10, carried on a horizontally swinging arm 20. Projecting downward from the arm 20 beneath the brackets 10 is a stud 11 turning in a bearing in a carriage 12 (see Fig. 8), the construction being such that the movements of the swinging-arm 20 impart a horizontal oscillatory movement to the trunnion bearings 9, 9. The carriage 12 is slidably mounted upon a guide 13, Fig. 8, which is rigidly fixed to the base 14. For the purpose of imparting a sliding or to and fro movement to the carriage 12 there is mounted at one side of the base 14 a horizontally revoluble crank 15 (see Fig. 7) having a crank pin 18 entering a slot 19 in lever 17, fulcrumed at 16 on the opposite side of the base from the crank 15, the construction being such that the revolutions of the crank 15 will cause the lever 17 to oscillate on its fulcrum in the manner indicated in dotted lines, Fig. 7. The lever 17 is connected to carriage 12 by link 17', to the end that the oscillations of the lever will cause the carriage to slide forward and backward upon the guide 13.

For the purpose of imparting to trunnion bearings 9, 9, the turning or oscillating movement to open and close the fingers, the swinging lever 20 extends rearwardly across and rests upon the base 14, and each of said levers has at its rearward end an outwardly extending arm 21, Fig. 9, terminating in a vertical eye-piece 21'. Between the eye-pieces 21' on the two levers 20 (see Fig. 7) extends a rod 23 which passes loosely through the eye-pieces and has a nut or bolt on its exterior end, said rod being also supported by eye-piece 25 on a bracket 24 extending rearwardly from the base. Surrounding the rod 23 and reacting between the eye-pieces 21' and 25 on either side of said eye-pieces is a spring 22.

The opening movement of fingers 2, 2, is effected by causing the outer ends of levers 20 bearing the eye-pieces 21', to swing inward or toward each other. For the purpose of accomplishing this function, there is rigidly attached to base 14 two plates 26, 26, which project over the levers 20 (see Fig. 7), and said levers are provided with upwardly projecting pins 27 lying normally in a cut-away portion of each plate 26, which portion extends rearward and is of such form that, for a larger portion of the rearward movement, the walls of the cut-away portion do not act upon the pins 27. At the outer portion of said plates, and near the end of the outward travel of the pins 26, when the levers 20 are actuated by the swinging lever 17, said plates are provided with inwardly inclined cam surfaces 28 upon which the pins 26 impinge, thereby forcing said pins, and with them the levers 20, inwardly or toward each other. This movement is effected against the tension of springs 22, and causes the oscillation of the trunnion bearings 9, 9, thereby effecting the opening movement of the fingers 2, 2. When the ends of the swinging levers 20 are in the position to effect this opening movement a latch 29 (see Figs. 6 and 7) which is pivoted to one of the arms 20, catches over the other arm 20 and thus retains the fingers in open position. The outer or free end of said latch 29 projects beyond the arm 20 and when in latched position projects also downward so that a part thereof, as the carriage moves forward, impinges upon the upwardly inclined face of a releasing cam 30, Fig. 7, which lifts the latch, thereby causing it to release the levers 20, when the springs 22 swing said levers apart, thereby causing the fingers 2, 2, to close or asume a gripping position.

For the purpose of imparting the vertically oscillating movement to fingers 2, 2, counter-weights 31, 31 are placed upon the arms 1, 1, intermediate the trunnions and the grip-fingers. These counter-weights act to overbalance the outer ends of the arms 1, 1, and depress the gripping fingers 2, 2.

Figures 1, 2, 3, 4, 5, 5A, 6:
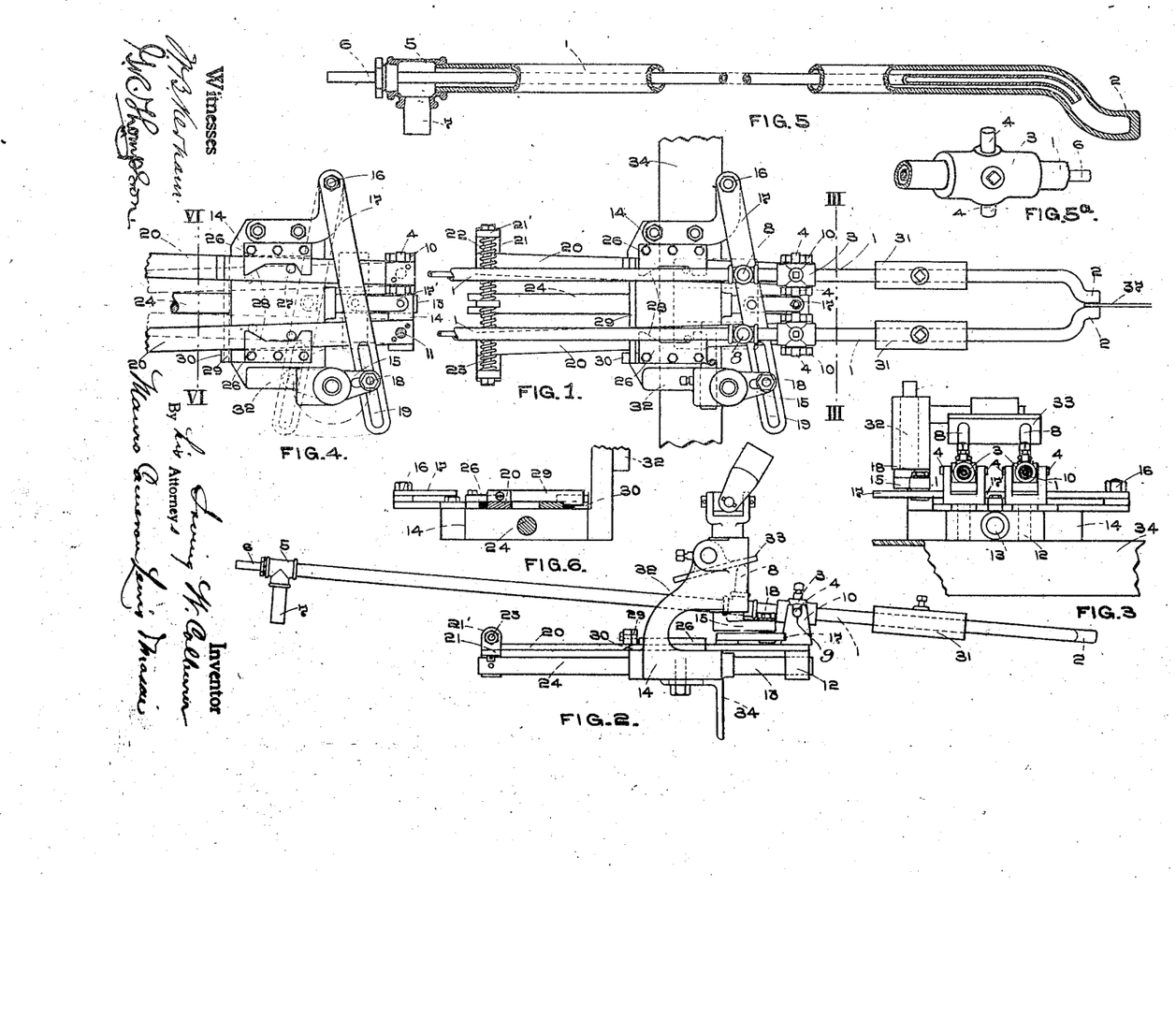
—Figure 1 is a plan view of my gripping and side-holding fingers, and the elements operating therewith.
Fig. 2 is a side elevation of Fig. 1.
Fig. 3 is a section on the line III—III, Fig. 1, looking to the left.
Fig. 4 is a plan view with the arms of the gripping fingers removed, the rear end of the swinging lever being broken away.
Fig. 5 shows one of the arms with portions broken away and other portions in section.
Fig. 6 is a section on the line VI—VI, Fig. 4, looking to the right.
Figure 2:
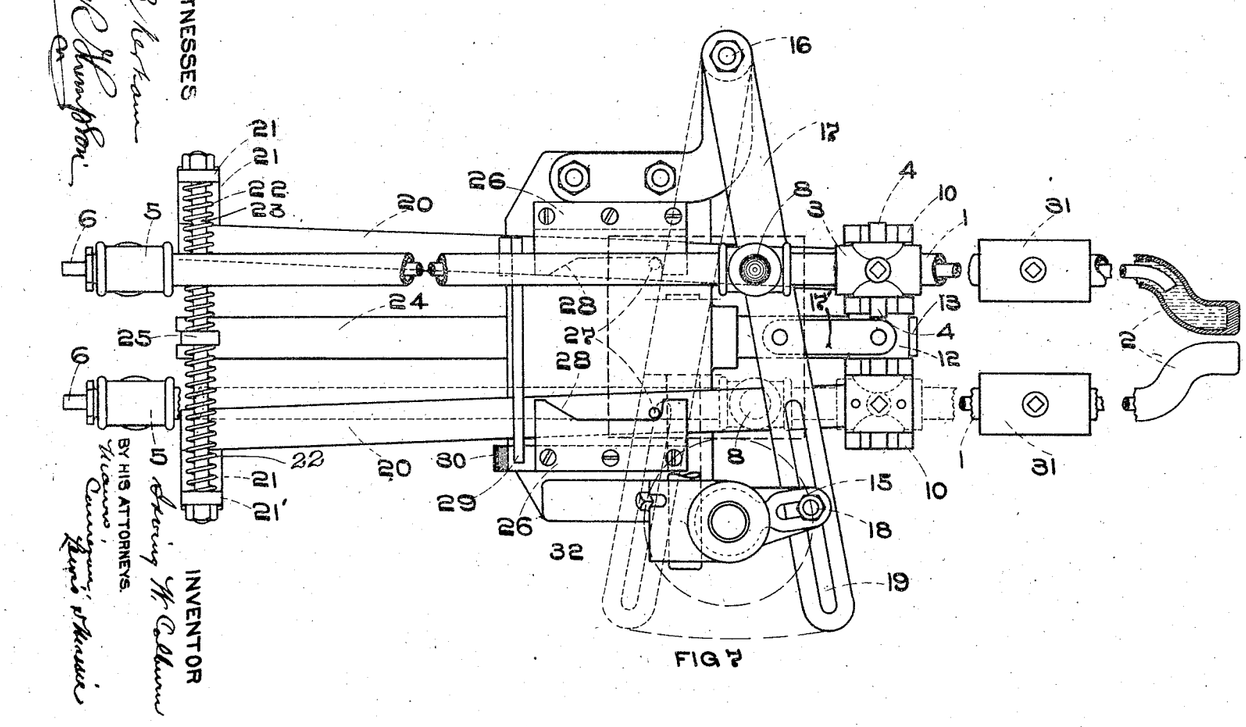

Referring to Figs. 3 and 8. 33 is a plate adjustably mounted upon the bearing 32 of the crank shaft. This plate is above the arms 1, 1, and is inclined downward and away from the gripping fingers 2, 2, with its lower inclined face in the line of travel of the before-mentioned studs 8, 8, carried by said arms. As the arms travel rearward, the studs 8, 8, impinge upon the under side of the inclined plate, thereby causing the arms to swing downward, and as said arms travel forward, that is toward the sheet of glass being drawn, the pins 8, 8, rise, this being permitted by the inclined face of plate 33, the counter-weights acting to move the fingers downwardly. The angle of inclination of said plate 33 in part determines the speed and also determines the extent of vertical movement of the fingers 2, 2, and by adjusting said plate at the proper angle, the fingers may be caused to operate with the related drawing mechanism in effecting the upward travel of the sheet of glass. If desired, the fingers could also be caused to lag somewhat with relation to the upward travel of said sheet.

Figure 10:
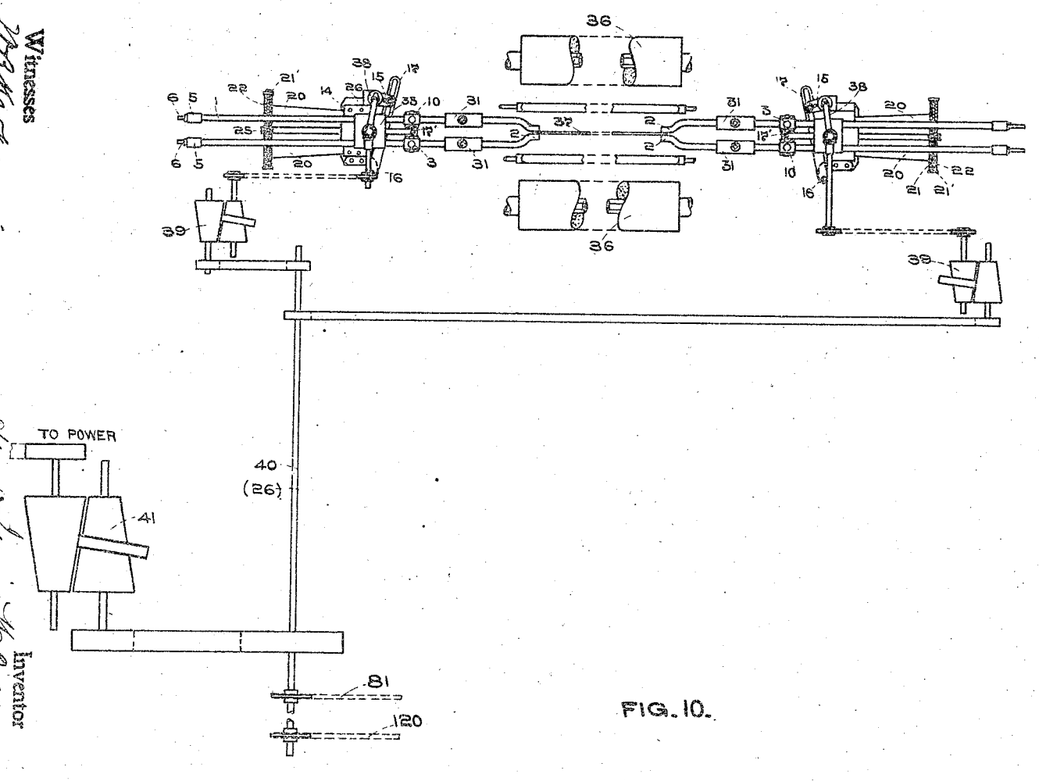
Fig. 10 is a diagrammatic plan view of two of my width-maintaining devices, showing them in their proper relative positions, together with the variable speed transmission through which they and the related drawing mechanism are driven.

As thus described, my improved width-maintaining device may be applied to any suitable machine for continuous drawing of sheet glass. Preferably, however, it is applied to my improved continuous sheet glass drawing machine shown and described in my patent and application aforesaid. When so applied, the base 14 is adjustably mounted on a suitable bracket or support 34, Fig. 11, one of which is located on each side of the working chamber 35 of the machine. The fingers 2, 2, are positioned centrally between the skimming rolls 36, see Fig. 12, in lateral alinement with the upwardly moving sheet of glass 37, and somewhat above the surface of the molten glass in said working chamber. The purpose and operation of said skimming rolls 36 are fully set forth in my said Letters-Patent #836,439, and need not be herein specifically described. Motion is imparted to the crank 15 by means of shaft 38, to which power is transmitted through the variable speed pulley 39, which in turn receives its power from a jack-shaft 40, which is also driven by a variable speed pulley 41, which latter shaft receives movement from any suitable power device, such for example as an electric-motor 42. It is to be particularly noted that by the system of power transmission above set forth I am enabled to regulate the speed or operation of each width-controlling or maintaining device independent of the other by means of the variable change-speed pulleys 39, one of which is provided for each of the shafts 38 on the opposite sides of the machine, see Fig. 10. Furthermore, the speed of operation of the machine as a whole may be regulated by means of the variable speed pulley 41.

The operation of my device is as follows: As the sheet of glass is drawn upward in the manner and by the mechanism fully and clearly set forth in my said application, the edges of the sheet are intermittently seized by the fingers 2, 2, which retain their hold on said edges for a short interval of the upward movement of said sheet and automatically move upward therewith, and, if desired, even at a slightly greater speed, for the purpose of assisting the drawing mechanism and causing the upward movement of the sheet of glass; said fingers also move outward, thus exerting a stretching action upon the sheet; they then automatically release their hold, recede or move outward, downward and inward to again seize the edges of the sheet of glass, this operation being automatically continued throughout the drawing of the sheet. The intervals of the seizures aforesaid may be varied as circumstances and conditions require by means of the variable speed pulleys 39, and the seizures upon either edge of the sheet may be isochronal, or otherwise, as circumstances may require.

Figure 11:
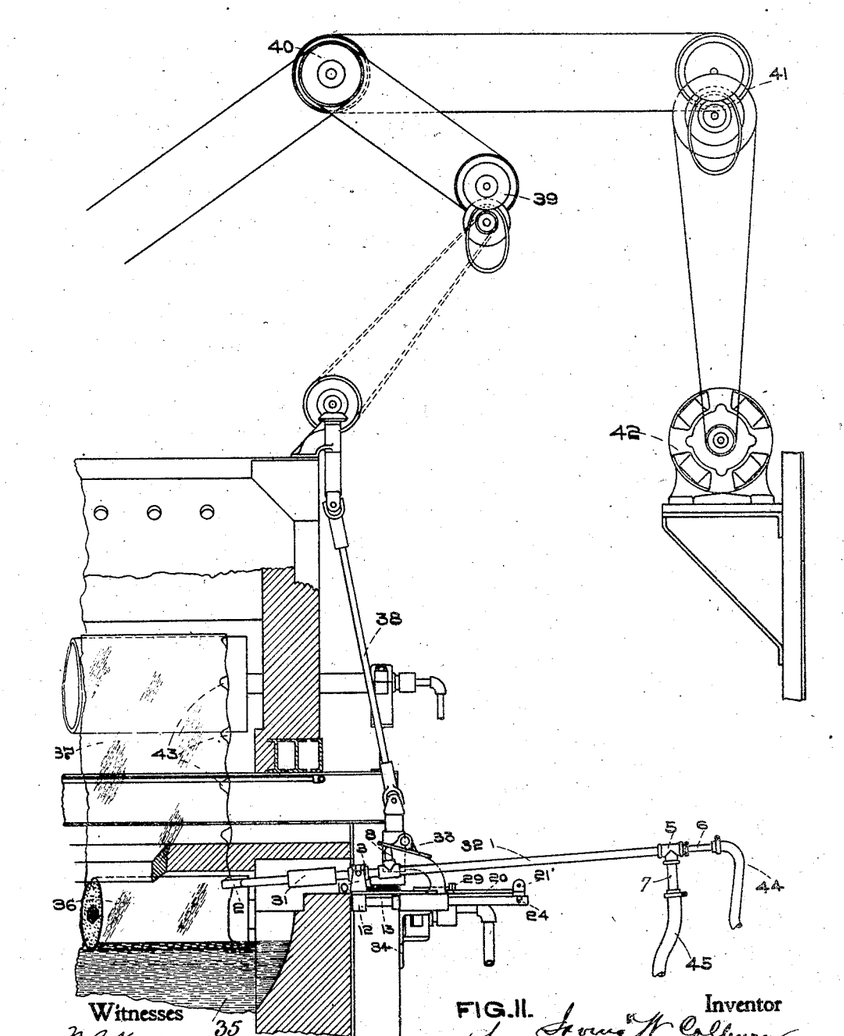
Fig. 11 is a vertical section on the line XI—XI, Fig. 12.

In Fig. 11 the impressions 43 of the gripping fingers 2, 2, upon each edge of the sheet are clearly shown.

For the purpose of delivering water or other cooling fluid to arms 1, 1, and fingers 2, 2, and conveying the same therethrough, there is attached to the outer end of tube 6 and to branch 7, a flexible inlet connection 44 and a like outlet connection 45, said inlet connection leading from any suitable source of cooling fluid, and outlet connection 45 leading to a sewer or other desirable place of discharge.

Figure 12:
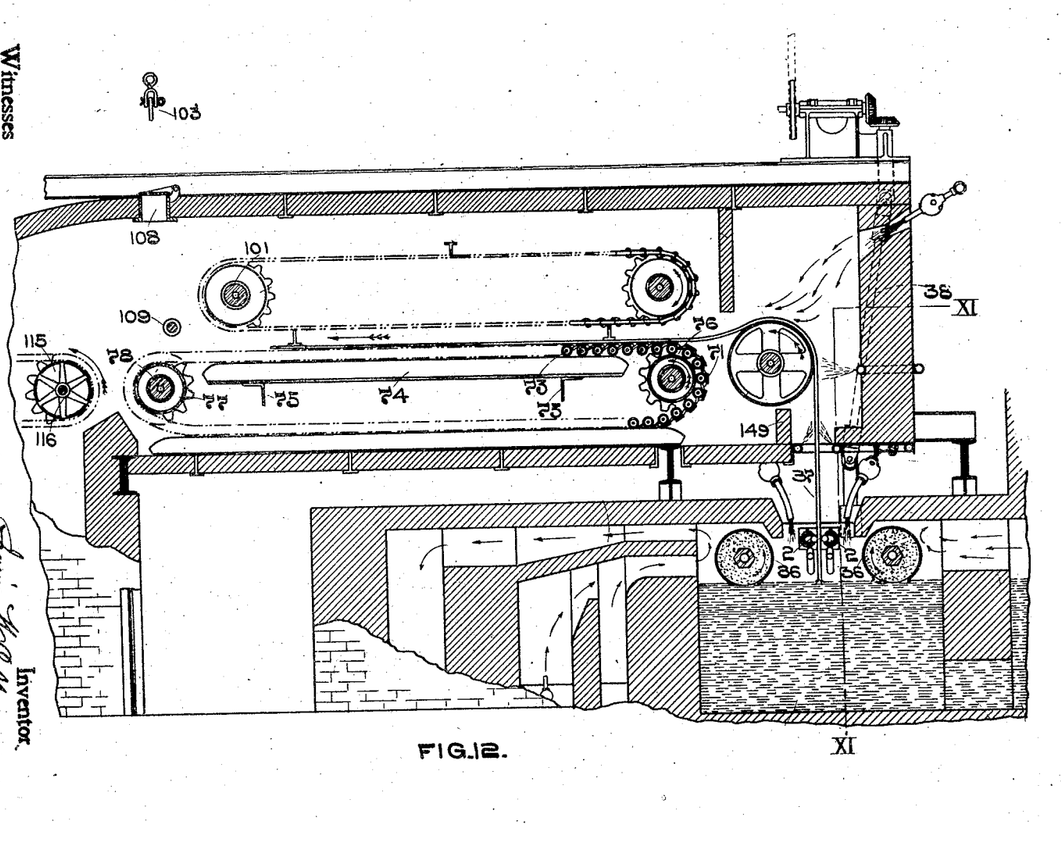
Fig. 12 is a central longitudinal vertical section of the working chamber at the end of my continuous glass drawing machine, showing my width-maintaining device applied thereto.

Some of the reference numerals in Fig. 12 are those for corresponding parts in my aforesaid application, many reference numerals of said application, however, which would be duplicates of those herein used, being omitted in the drawings to avoid confusion.

What is claimed is:

1. In sheet glass drawing apparatus, the combination of means for drawing a sheet of glass, with automatic width-maintaining means intermittently seizing the edges of the sheet during the drawing operation.

2. In sheet glass drawing apparatus, the combination of means for drawing a sheet of glass, with automatic width-maintaining means intermittently seizing and releasing the edges of the sheet during the drawing operation.

3. In sheet glass drawing apparatus, the combination of means for drawing a sheet of glass, with automatic sheet-stretching means intermittently seizing the edges of the sheet during the drawing operation.

4. In sheet glass drawing apparatus, the combination of means for drawing a sheet of glass, with automatic sheet-stretching means intermittently seizing and releasing the edges of the sheet during the drawing operation.

5. In sheet glass drawing apparatus, the combination of means for drawing a sheet of glass, with automatic width-maintaining and sheet-stretching means intermittently seizing and releasing the edges of the sheet during the drawing operation.

6. In sheet glass drawing apparatus, the combination of means for drawing a sheet of glass, with automatic width-maintaining means seizing the sheet at measured intervals, and means for varying said intervals.

7. In sheet glass drawing apparatus, the combination of means for drawing a sheet of glass, with automatic width-maintaining and sheet-stretching means seizing the sheet at measured intervals, and means for varying said intervals.

8. In sheet glass drawing apparatus, the combination of means for drawing a sheet of glass, with automatic width-maintaining means seizing the edges of the sheet at stated intervals during the drawing operation, devices imparting movement to said means during said seizures, and adjustable power mechanism controlling the rate of said movement.

9. In sheet glass drawing apparatus, the combination of means for drawing a sheet of glass, with a plurality of sets of automatic means intermittently seizing the opposite edges of the sheet during the drawing operation to maintain the width of the sheet, and devices independently timing the duration of the seizures by each of said sets of means.

10. In sheet glass drawing apparatus, the combination of means for drawing a sheet of glass, with a plurality of sets of automatic means one set located approximate to each edge of the sheet and intermittently seizing said edges at stated intervals during the drawing operation, and independently controlled means for applying power to each of said sets, whereby their action may be caused to be isochronal or otherwise as desired.

11. In sheet glass drawing apparatus, the combination of mechanism for drawing a sheet of glass, with automatic means intermittently seizing the edges of the sheet at predetermined intervals during the drawing operation, means regulating the length or duration of said intervals, and means controlling the rates of movement of said drawing mechanism and said seizing means, whereby the said movements may be synchronized.

12. In sheet glass drawing apparatus, the combination of mechanism for drawing a sheet of glass, a plurality of sets of automatically operated fingers seizing each edge of the sheet during the drawing operation, means automatically actuating said fingers in the direction of movement of said sheet for a predetermined interval, means automatically moving each set of fingers outward whereby a stretching action is exerted on the edges of the sheet, and automatic releasing means actuating said fingers to release them at the end of each of said intervals, and means moving said fingers downward.

13. In sheet glass drawing apparatus, the combination of mechanism for drawing a sheet of glass, with width-maintaining fingers automatically seizing the edges of the sheet during the drawing operation, and automatic cooling devices coöperating with said fingers to cool the same.

14. In sheet glass drawing apparatus, the combination of mechanism for drawing a sheet of glass, with automatic width maintaining means seizing the edges of the sheet and coöperating with the said drawing mechanism in the upward or drawing movement of the sheet.

15. In sheet glass drawing apparatus, the combination of mechanism for drawing a sheet of glass, with automatic width-maintaining means intermittently seizing the edges of the sheet during the drawing operation, and mechanism moving said means upward and outward during the drawing operation, whereby said width-maintaining means coöperate with the drawing mechanism in effecting the upward movement or drawing of said sheet.

16. In a sheet-glass drawing apparatus, the combination of sheet-drawing means, with width-maintaining means seizing the edges of the sheet, and means simultaneously operating said drawing means and said width-maintaining means.

17. In a sheet-glass drawing apparatus, the combination of sheet-drawing means, with width-maintaining means intermittently seizing and releasing the edges of the sheet, and means simultaneously operating said drawing means and said width-maintaining means.

18. In a sheet-glass drawing apparatus, the combination of sheet-drawing means, and sheet-stretching means intermittently seizing the edges of the sheet, with operating devices connected to said sheet-drawing means and to said sheet-stretching means.

19. In a sheet-glass drawing apparatus, the combination of sheet-drawing means, and width-maintaining and sheet-stretching means intermittently seizing and releasing the edges of the sheet, with operating devices connected to said sheet-drawing means and to said width-maintaining and sheet-stretching means.

20. In a sheet-glass drawing apparatus, the combination of sheet-drawing means, with automatic width-maintaining means seizing the edges of the sheet at stated intervals, and devices imparting movement to said width-maintaining means during said seizures.

In testimony whereof I have signed this specification in the presence of two subscribing witnesses.

IRVING W. COLBURN.

Witnesses:
E. R. INMAN,
GILSON SHAFFER.